ary Examiner—Philip Goodman
United States Patent [19]
Nodwell

[11] 3,958,839
[45] May 25, 1976

[54] SEGMENTED TRACK
[75] Inventor: John H. Nodwell, Calgary, Canada
[73] Assignee: Foremost International Industries Ltd., Calgary, Canada
[22] Filed: Feb. 18, 1975
[21] Appl. No.: 550,386

[52] U.S. Cl. .................................. 305/35 R; 305/39
[51] Int. Cl.² ........................................ B62D 55/18
[58] Field of Search ............... 305/35 R, 35 EB, 36, 305/37, 39, 41, 43

[56] References Cited
UNITED STATES PATENTS
2,815,988  12/1957  Dowell ................................. 305/37
3,853,359  12/1974  Pusch ............................. 305/35 EB Primary Examiner—Philip Goodman
Assistant Examiner—John A. Carroll

[57] ABSTRACT

A vehicle track comprising continuous belts formed of moulded elastomeric segments joined in end-to-end relationship. The segments are generally flat with enlarged sections at each end to provide transverse ribs. The segments are connected together by connections each of which includes inner and outer plates having concave cross-sections overlying the ribs of adjacent segments, the inner and outer plates being secured together by bolts. The inner and outer plates may be formed by transverse grouser bar assemblies. The segmented belts are more convenient to produce, ship and install than common endless belts. The manner of connecting the segments results in the bending taking place within the segment so as to provide a belt wherein wear and fatigue do not occur at the connection.

1 Claim, 4 Drawing Figures

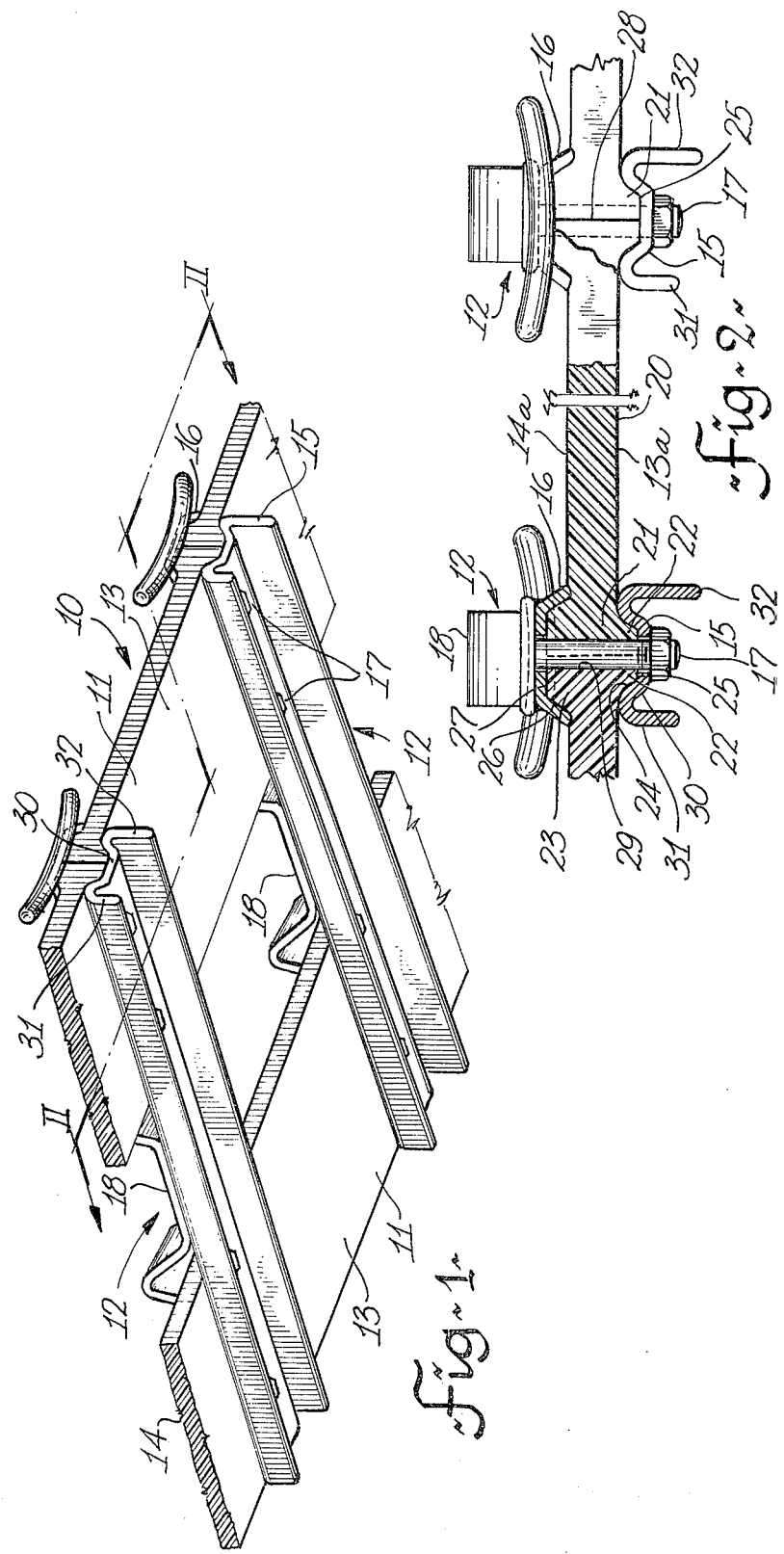

SEGMENTED TRACK

This invention relates to a track for an endless track vehicle.

One type of track which is now commonly used is the ladder style track. It consists of two parallel continuous belts of considerable width. The belts, which are formed of flexible material, such as reinforced rubber, are transversely spaced but joined by a number of transversely extending grouser bar assemblies. This type of track has gained wide acceptance since it provides light ground pr essure and good traction and yet it is relatively durable. Nevertheless, when used on large commercial vehicles the complete track is heavy and bulky to handle and when making repairs in the field heavy equipment is required. The machinery required to produce the long belts is expensive. If only a short section of one belt is damaged in the field it may be necessary to remove the complete track for repair, and the entire belt, although otherwise in good condition, may have to be replaced. An endless belt which has been made to a particular length for a specific vehicle, cannot be used on another type of vehicle thus making it necessary to produce and stock a number of sizes.

Although attempts have been made to produce an endless track from a number of segments, the track, which was formed by segments joined by hing-type connections, has not proved to be sufficiently durable. Failure in the intermeshing lugs of the segments forming the hinge-type connection rapidly occurs.

It is an object to provide a track having durable belts formed by a number of segments joined in end-to-end fashion.

According to the present invention there is provided in a vehicle track, a continuous belt formed by a plurality of segments joined in end-to-end relationship by connector means, each segment being a generally flat moulded elastomeric body defining an inner surface and an outer ground engaging surface extending between opposite ends thereof. A transverse rib is provided adjacent each end of the segment on at least one of the surfaces, each segment having opposite end edge surfaces abutting against like end edge surfaces of adjacent segments. The connector means includes inner and outer plate means extending transversely of the belt, at least one of the plate means being of concave cross-section and overlying the ribs of two adjacent segments. Bolt means secure the plate means together with adjacent ends of the segments clamped therebetween and prevent relative movement of the adjacent ends.

Preferably each end of the segment is provided with an enlarged section so that there is formed ribs projecting oppositely from both of the inner and outer surfaces. With this arrangement both of the inner and outer plate means are of concave cross-section for receiving the ribs of adjacent segments.

In a preferred embodiment of the invention the inner and outer plate means of the connector means are formed by a backing plate and a grouser bar respectively.

In the above-described belt of the present invention, a rigid connection is provided between the segments and all of the bending action required by the track takes place within the segments.

In the accompanying drawings, which show preferred embodiments as examples of the present invention, FIG. 1 is a bottom view of a section of one embodiment of the vehicle track.

FIG. 2 is a sectional view through the track as seen from the line II—II of FIG. 1.

Figure 3:
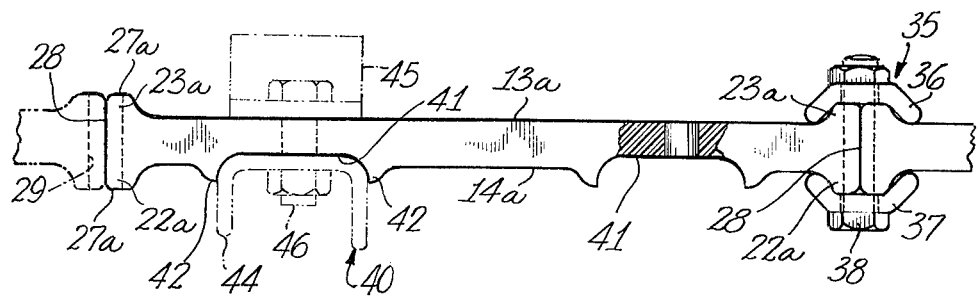
FIG. 3 is an edge view, partially in section, of another embodiment of the segmented belt of the present invention.

Referring to FIG. 1, the reference numeral 10 denotes a vehicle track of the ladder type, the track consisting of two parallel, transversely spaced, continuous belts 11,11 which extend in the longitudinal direction of the track, the belts 11,11 being joined by transversely extending grouser bar assemblies 12. The belts 11,11 have lower ground engaging surfaces 13 and upper surfaces 14. The grouser bar assembly, as shown in FIGS. 1 and 2 include a grouser bar 15 engaging surfaces 13 and a backing plate 16 which engages upper surfaces 14 and provide a wheel guide 18 in the space between the parallel belts. The grouser bar 15 and the ba cking plate are secured together by bolts 17 which pass through the belts, the belts 11,11 being clamped between the grouser bar and the backing plate.

Each belt 11 is formed by a plurality of segments 20, arranged in end-to-end fashion each segment being joined to the adjacent segment by a connector means, which, in the embodiment shown in FIGS. 1 and 2, is provided by the grouser bar assembly 12. Each segment 20 is in the form of a generally flat moulded elastomeric body which defines outer surface 13a and inner surface 14a, the outer surfaces 13a of the joined segments providing ground engaging surface 13, and the inner surfaces 14a of the segments forming the belt providing inner surface 14.

Each segment is enlarged at opposite ends as shown at 21 to provide transverse ribs 22 projecting from outer surface 13a and transverse ribs 23 projecting from inner surface 14a. The ribs 22 and 23 extend across the width of the segments. The rib 22 is defined by a surface 24, which slants away from surface 13a to a raised surface 25 which is substantially parallel to surface 13a. Similarly rib 23 is provided by a surfac e 26 which slants away from surface 14a to a surface 27 which is substantially parallel to surface 14a. End edge surface 28 is normal to surfaces 13a and 14a and is flat except for a number of semi-circular openings 29, the longitudinal axis of which extends perpendicular to the flat body of the segment 20. The opening 29 match with like openings in the adjacent segment so that as end surfaces 28 of adjacent segments are brought into abutment the matched openings provide circular openings for bolts 17.

Each grouser bar 15 is of a modified U-shape configuration having base portion 30, and leg portions 31,32 in cross-section. One leg portion 31 may be longer than the other for improved traction. The base portion 30 curves away from the plane of the outer surfaces 13a of the segments 20 so as to provide a concave section in the base portion 30, the concave section being shaped to closely overlie the juxtaposed transverse ribs 22 of abutting segments. The backing plate is of an open U-shaped configuration in cross-section so as to closely receive the ribs 23 on the inner side of the segments. Thus when the backing plates and grouser bars are clamped to the belts 11,11, the grouser bar assemblies tightly secure the segments of each belt in end-to-end fashion. The backing plates and grouser bar are so shaped in relation to the ribs, that rigid connections are formed whereby all flexing of the belts takes place between the joints provided within the grouser bar assemblies.

Figure 4:
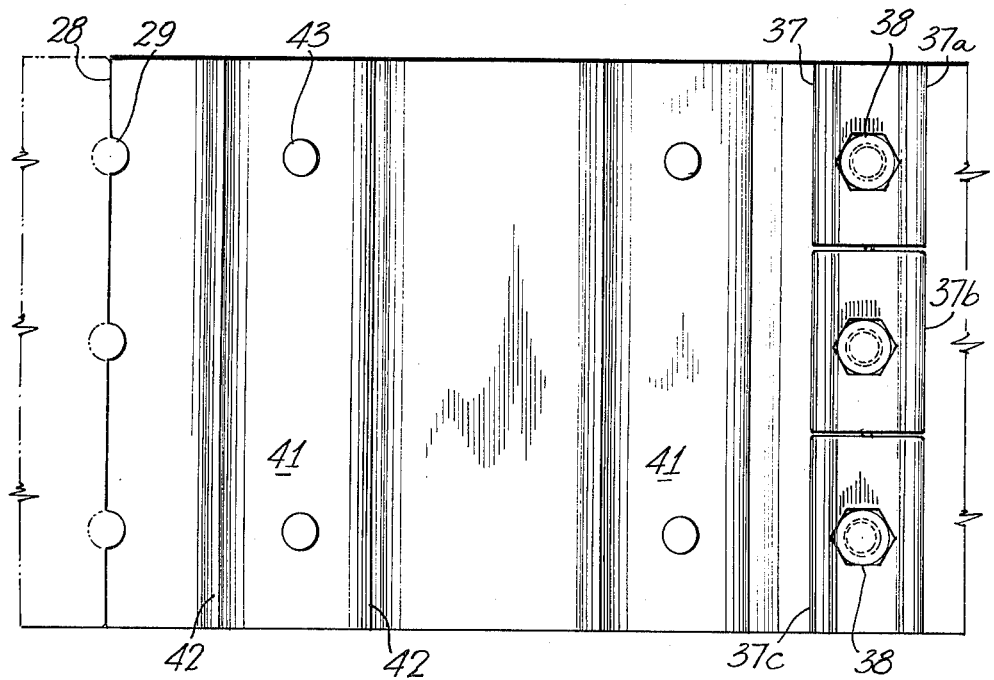
FIG. 4 is a bottom view of the belt shown in FIG. 3.

In the embodiment shown in FIGS. 3 and 4, like elements are denoted by like reference numbers. The connector means 35 are provided by inner plate means 36 and outer plate means 37, both of which are of concave shape. The belt segment 20a are similar to those shown in the previous embodiment, each segment 20a having an enlarged section so as to provide transverse ribs 22a and 23a projecting from the outer and inner surfaces of the segment. The enlarged sections are defined by surfaces curving smoothly outwardly from the outer and inner surfaces of the segment to raised surfaces 27a which are generally parallel to the outer and inner surface. The raised surface 27a merge by way of arcuately curved surfaces into the end edge surface 28. The inner and outer plate means 36,37 are so shaped in cross-section that they tightly enclose the ribs 23a and 22a when clamped together by bolts 38 in the same manner as the grouser bar assemblies of the previous embodiment. As best seen in FIG. 4 the inner plate means 36 or outer plate means 37 or both may be made up of a number of segments 37a, 37b, 37c, arranged in end-to-end fashion across the belt. The segments forming the inner and outer plate means may be of identical configuration and formed, for example, by a stamping from ¼ inch thick steel plate. By forming the plate means from a number of shorter segments some flexing of the belt across its width is permitted.

Unlike the track of the embodiment shown in FIGS. 1 and 2, the segments of the two belts forming the track illustrated in FIGS. 3 and 4 are joined by separate connector means. The two belts are connected, however, with transverse grouser bar assemblies 40 which are shown in chain dotted lines in FIG. 3. The outer surface 14a of each segment 20a is preferably provided with transverse channels 41, which are formed between a pair of raised ribs 42,42. Across the width of the segment, circular openings 43 extend through the belt from the bottom of channels 41. The grouser bar assembly 40 includes a grouser bar 44, a combination backer plate and wheel guide 45 and bolts 46 which extend through openings 43. The grouser bar assemblies 40 span a pair of the belts and a space therebetween to form a ladder type track.

The segments 20 or 20a may be made of any desired length. For example the segments 20a may be considerably longer than that illustrated and include a plurality of channels 41. The segments are preferably of a length, however, which can be manually carried so that unlike the known tracks which utilize continuous belts, all components making up the track can be easily assembled and repaired by men without using large equipment.

The segments may be produced in a single relatively injection mould. Any length of track may be produced by using a standard size segment. In tracks having endless bands, the bands must be made to the length required. The segments may be shipped in any convenient size package making it unnecessary to utilize large equipment when handling and loading. When a track is damaged a segment may be replaced in the field by men using light tools instead of having to remove and return the complete track which requires heavy meachinery and transporting equipment. Spare segments may be purchased and stored at a much lower cost.

It is apparent that modifications may be made to the illustrated embodiments without departing from the spirit of the invention as defined in the appending claims.

I claim:

1. A vehicle track comprising a pair of longitudinally extending, spaced parallel belts joined by a plurality of transversely extending grouser bar assemblies, each belt being formed by a plurality of segments joined in end-to-end relationship, each segment being a generally flat moulded elastomeric body defining an inner surface and an outer ground engaging surface extending between opposite ends of said segment, said segment having enlarged sections to provide transverse ribs projecting oppositely from both said inner and outer surfaces adjacent the ends of said segment, each rib providing a flat surface normal to said inner and outer surfaces and forming said end edge surface of the segment, said grouser bar assembly being located at abutting ends of adjacent segments and forming connectors for said segment, each assembly including a grouser bar having a concave inner surface overlying the transverse ribs on the outer surfaces of abutting segments, a backing plate having a concave inner surface overlying the transverse ribs on the inner surfaces of abutting segments, and bolt means drawing said grouser bar and backing plate together, said flat surface forming said end edge surface being interrupted across the width of the segment with a plurality of openings of semicircular cross-section and extending perpendicular to said flat body, said openings when matched with like openings in an adjacent segment providing circular bores for said bolt means.

* * * * *